United States Patent [19]

Anderka et al.

[11] Patent Number: 4,552,483

[45] Date of Patent: Nov. 12, 1985

[54] DEVICE FOR COVERING AN OBLONG OPENING IN A HOUSING

[75] Inventors: Gerold Anderka, Ellerbek; Joachim Brandt, Hamburg; Gerhard Deblitz, Quickborn; Rolf Martens, Hamburg; Rolf Paschen, Elmshorn; Bernd Willimczik, Wedel, all of Fed. Rep. of Germany

[73] Assignee: Koh-I-Noor Rapidograph, Inc., Bloomsbury, N.J.

[21] Appl. No.: 646,187

[22] Filed: Aug. 31, 1984

[30] Foreign Application Priority Data

Sep. 6, 1983 [DE] Fed. Rep. of Germany ....... 3332044

[51] Int. Cl.[4] ........................................... F16B 17/00
[52] U.S. Cl. ..................................... 403/288; 403/80; 308/3.5
[58] Field of Search ................... 403/288, 410, 80, 50, 403/51; 308/3.5; 160/122

[56] References Cited

U.S. PATENT DOCUMENTS

| | | | |
|---|---|---|---|
| 2,418,639 | 4/1947 | Horman | 143/6 |
| 2,601,361 | 6/1952 | Blatz | 160/122 |
| 2,615,762 | 10/1952 | Gesner | 308/3.5 |
| 2,785,262 | 3/1957 | Bourns | 201/62 |
| 2,811,201 | 10/1957 | Reid, Jr. | 160/122 |
| 2,897,888 | 8/1959 | Dragonuk | 160/99 |
| 3,742,609 | 7/1973 | Jeannet et al. | 160/99 |
| 3,934,480 | 1/1976 | Nederlof | 403/288 X |
| 4,365,764 | 12/1982 | Marx | 308/3.5 |

FOREIGN PATENT DOCUMENTS

| | | |
|---|---|---|
| 2265080 | 8/1976 | Fed. Rep. of Germany . |
| 7922890 | 11/1979 | Fed. Rep. of Germany . |
| 3038716 | 4/1982 | Fed. Rep. of Germany . |
| 8234393.4 | 4/1983 | Fed. Rep. of Germany . |

OTHER PUBLICATIONS

Teledyne Gurley, Pathfinder# DIGITAL READOUT SYSTEMS, Publication No. 8780-75-879.

*Primary Examiner*—Andrew V. Kundrat
*Attorney, Agent, or Firm*—David H. Semmes; Warren E. Olsen

[57] ABSTRACT

A device for covering an oblong housing opening (3), along which an element (5) extending with one portion of itself into the housing (1) is movable back and forth, which comprises a flexible band (4), which immovably is secured at each end of the housing opening (3). The band is guided via deflecting rollers (6, 7) and guide rollers (8, 9) secured on the element (5), so as to train about the proximate portion of the element (5), which extends within the housing (1). The deflecting rollers (6, 7) and the guide rollers (8, 9) enable a shifting of the element (5) in the longitudinal direction of the housing opening (3) and with respect to the band (4).

4 Claims, 3 Drawing Figures

DEVICE FOR COVERING AN OBLONG OPENING IN A HOUSING

BACKGROUND OF THE INVENTION

1. Field of the Invention

The present invention relates to a device for covering an oblong opening in a housing, wherein an element extending with a portion of itself into the housing is movable back and forth, along the opening. The device comprises a flexible band connected with the element, and the width of the band is greater than the width of the opening in the housing. The band is held on the housing at the ends of the opening.

2. Brief Description of the Prior Art

In a known device (German Utility Model No. 82 34 393) for covering the surface of a machine bed, a band comprising two sections is provided, and one end of each section of the band is immovably secured to the carriage that is movable over the machine bed. The other end area of each section of the band is wound onto a roller, provided on the end of the machine bed. Since the band is of spring steel which has been deformed appropriately beforehand, a winding up of the band onto the roller at either end is effected automatically; that is, as the carriage moves relative to the machine bed, one section of the band is pulled off its roller and the other section is wound onto its roller.

This known device requires either a band with particular self-winding spring characteristics or, if such a band is not desired, then resilient clamping devices are needed to cooperate with the rollers, in order to wind up the respective band sections onto the roller and keep them taut. The capacity of such a device to function becomes impaired, should the spring action decrease as a result of material fatigue or the like.

A device is also known (German published application DE-OS No. 22 65 080) in which a machine bed and a belt-driven carriage are enclosed by a casing, in which there is a slit through which a tool carrier extends. A belt, which acts as the carriage drive means, extends on the inside of the slit and is used as a covering means. The belt further is guided over two rollers, provided at the ends of the slit; an upper segment acting as the slit covering, and a lower segment. However, this approach makes a relatively large belt dimension necessary. Furthermore, it must be assured that the upper segment of the belt is always taut; that is, it must be prevented from becoming slack, because of stretching or fatigue of the material caused by the continual movement of the belt back and forth, and thereby becoming spaced apart from the slit.

OBJECT AND SUMMARY OF THE INVENTION

Accordingly, the object of the invention is to devise a device for covering an opening in a housing which is simple in structure, wherein the danger that the covering action will be impaired because of stretching or fatigue of the material is extremely small.

In order to attain this object, a device of the type generally described above is embodied in accordance with the invention such that the band is immovably secured on the ends of the opening in the housing. Deflecting rollers for deflecting the band into the housing are provided on the element in the vicinity of the housing opening, and guide rollers, to guide the band about an inner end face of the element, are provided on the portion of the element located inside the housing.

In a preferred embodiment of the invention, a continuous band is disposed to cover the housing opening. The ends of the band are immovably secured to the ends of the opening. The band is guided over guide rollers proximate the portion of the element extending into the housing, in a particular manner. If the element should shift within the longitudinal direction of the housing opening, it is merely a different portion of the band that travels over the deflecting and guide rollers: as the areas of the band located between the end of the housing opening and the associated deflecting roller still securely and reliably seal off the opening in the housing. The band does not need to be wound up resiliently, and it does not execute any movements in the longitudinal direction of the housing opening. Hence, frictional wear from movement along the corresponding housing wall does not occur.

In order to assure sealing over the entire area between a secured end of the band and the adjacent deflecting roller, the ends of the band may be secured resting on the inside wall defining the housing opening. Further, a longitudinal line tangent to the outer surfaces of the two deflecting rollers may be located in a plane that is offset inward into the housing, relative to the inside surface, by the thickness of the band which also extends parallel to the inside surface. It also is possible for the deflecting rollers to be disposed shifted slightly more inward inside the housing which creates a corresponding lifting of the band away from the inside surface of the wall defining the housing wall. Another alternative is to support the deflecting rollers resiliently, in such a manner that they press the band against the inside surface of the wall defining the housing opening.

The guide rollers are preferably located in a plane which extends parallel to the plane of the housing opening, so that the area of the band located between the guide rollers extends parallel to the portions of the band located between the respective ends of the band and the deflecting rollers.

A preferred embodiment of the invention now will be described in greater detail, wherein reference is made to the accompanying drawings, which are a schematic, simplified representation of that embodiment.

DESCRIPTION OF THE PREFERRED EMBODIMENT

Figure 1:
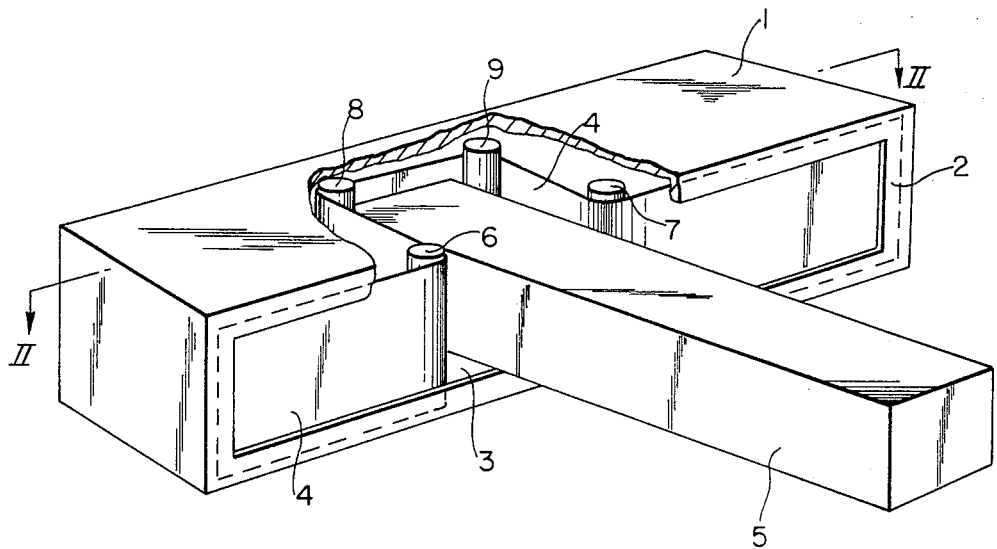
FIG. 1 is a perspective and partial section elevation view of a preferred embodiment, wherein a housing has an element extending into it and a covering for the housing opening.
Figure 2:
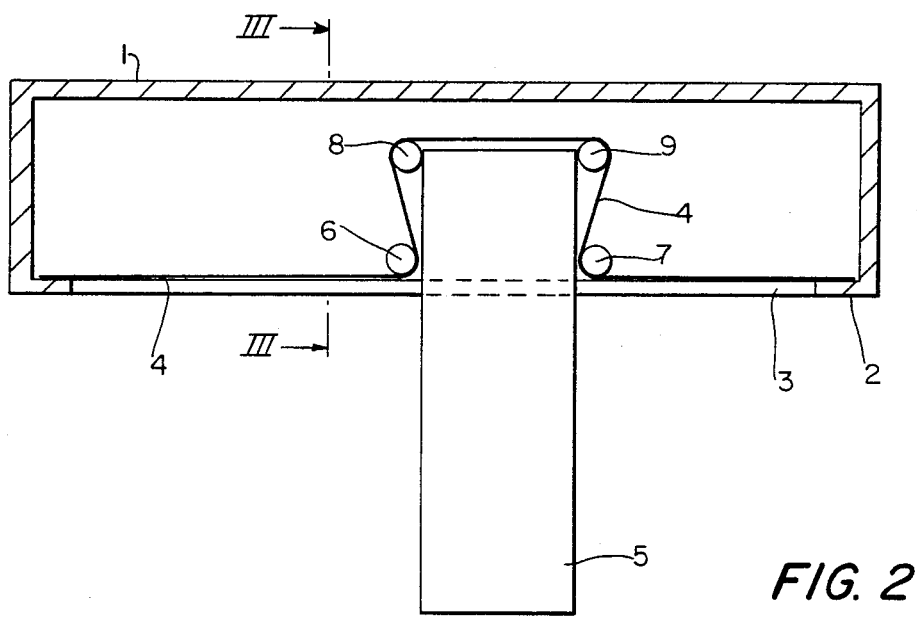
FIG. 2 is a top plan view, in section taken along line II-III of FIG. 1.
Figure 3:
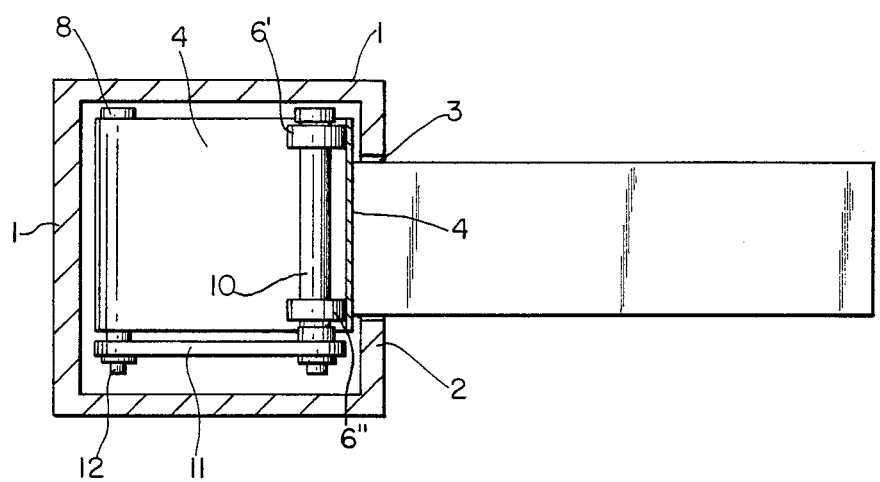
FIG. 3 is a side elevation view in section, taken along line III—III of FIG. 2.

The exemplary housing 1 of FIGS. 1–3 shown is part of an automatic drawing device known as a flat plotter, wherein an arm 5 is guided and moved by conventional positioning devices provided in the housing 1 (not shown). The arm 5 also has a carriage at its distal end (not shown), so that a drawing stylus, such as a tubular technical pen, can be secured and moved back and forth in the longitudinal direction of the arm 5.

An oblong, rectangular opening 3 is provided in the wall 2 of the housing 1, through which the arm 5 extends into the housing. A flexible band 4, preferably made of fabric or plastic, has a width which is greater than the width of the housing opening 3, and is secured at each end to the inside surface areas of the wall 2, at a point proximate to each, short, limiting edge of the housing opening 3. The band 4 may be secured, for instance, by gluing.

Deflecting rollers 6, 7 and guide rollers 8, 9 are secured to the proximate portion of the arm 5 which extends within the housing 1. The deflecting rollers 6, 7 are located adjacent the housing opening and preferably are positioned to press the band 4 guided over them against the inside surface of the wall 2. The guide rollers 8 and 9 are disposed on the proximate, inner end of the arm 5, and are spaced to guide the band 4 around the inner most end face of arm 5. As shown in FIG. 3, the deflecting roller 6, may comprise two partial rollers 6', 6", each rotatably supported upon a stationary shaft 10, secured to the underside of the arm by a bracket 11, which also supports the shaft 12 for the guide roller 8. A corresponding holder means is also provided for the deflecting roller 7 and the guide roller 9.

As illustrated, (FIGS. 1 and 2), the band 4 extends from the left end of the housing opening 3 where it is secured, to the first deflecting roller 6, while resting against the inside surface of the wall 2 over that entire length extending between the end of the band and deflecting roller 6. By means of the deflecting roller 6, the band 4 is guided in a space between the deflecting roller 6 and the arm 5, and toward the guide roller 8. The band rests on the portion of the outer surface of first guide roller 8, which is opposite the arm 5. From there the band is directed outward, about the second guide roller 9, and in between the arm 5 and the second deflecting roller 7. The band rests against the housing inside surface between the right end of the housing opening 3 and the deflecting roller 7, as best seen in FIGS. 1 and 2.

If the arm 5, which is held immovably in the housing 1 in the direction of the longitudinal extension of the arm, is moved up and down within the housing opening, 3, and parallel to this longitudinal extension, a corresponding change is brought about in the areas of the band which contact the deflecting rollers 6 and 7 and guide rollers 8 and 9. Nevertheless, the band 4 always reliably seals off those portions of the housiing opening 3 located between one end of the opening 3 and the associated deflecting roller 6 or 7 from dirt and the like, while the interior of the housing 1 additionally is covered by those portions of the band 4 which extend about the deflecting rollers 6 and 7 and guide rollers 8 and 9.

While a preferred embodiment of the invention has been shown and described, the invention is solely to be limited by the scope of the appended claims.

We claim:

1. A device for covering an oblong housing opening, along which a movable slide block element, having a proximate portion extending into the housing and a distal portion extending outward through said housing opening, is movable back and forth, which comprises a flexible band engaged to extend around the element proximate portion, the width of the band being greater than the width of the housing opening, wherein means to hold the band against an inner surface of the housing between the slide block element and each end of the housing opening, are characterized by means immovably securing the band (4) to the housing proximate each end of the housing opening (3), deflecting rollers (6, 7) adapted to deflect the band (4) into the housing (1), which are supported upon the slide block element (5) in the vicinity of the housing opening (3), and guide rollers (8, 9) to guide the band (4) about an inner end face of the element (5), which are supported upon the proximate portion of the slide block element (5), located within the interior of the housing (1).

2. A device as defined in claim 1, characterized further in that the means securing each end of the band (4) also rests the band against the inside surface of the wall (2) defining the housing opening (3), wherein a line tangent to the outer surface of each deflecting roller (6, 7) is located in a plane which is offset inward into the housing, relative to the inside surface, by the thickness of the band (4) and extends parallel to the housing inside surface.

3. A device as defined by claim 1, characterized in that the guide rollers (8, 9) are located in a plane which extends parallel to the plane of the housing opening (3).

4. A device as defined by claim 2, characterized in that the guide rollers (8, 9) are located in a plane which extends parallel to the plane of the housing opening (3).

* * * * *